US012595127B2

(12) United States Patent
Beach

(10) Patent No.: US 12,595,127 B2
(45) Date of Patent: Apr. 7, 2026

(54) SYSTEM AND METHOD FOR PICKING ITEMS

(71) Applicant: ZEBRA TECHNOLOGIES CORPORATION, Lincolnshire, IL (US)

(72) Inventor: Robert E. Beach, Los Altos, CA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 668 days.

(21) Appl. No.: 17/992,912

(22) Filed: Nov. 22, 2022

(65) Prior Publication Data

US 2024/0166444 A1     May 23, 2024

(51) Int. Cl.
B65G 1/137 (2006.01)

(52) U.S. Cl.
CPC .................................. B65G 1/1375 (2013.01)

(58) Field of Classification Search
CPC ..... B65G 1/1375; B25J 5/007; B25J 15/0014; B25J 15/0616
See application file for complete search history.

(56) References Cited

U.S. PATENT DOCUMENTS

| | | | |
|---|---|---|---|
| 9,827,677 B1 | 11/2017 | Gilbertson et al. | |
| 2011/0018291 A1 | 1/2011 | Osada et al. | |

| | | | | |
|---|---|---|---|---|
| 2019/0283251 A1 | * | 9/2019 | Nakamoto | ............... B25J 9/163 |
| 2020/0375111 A1 | | 12/2020 | Avigad | |
| 2021/0276203 A1 | | 9/2021 | Carithers et al. | |
| 2021/0389751 A1 | | 12/2021 | Wise et al. | |
| 2023/0020976 A1 | * | 1/2023 | Mutarelli | ............... B65G 61/00 |

FOREIGN PATENT DOCUMENTS

| | | | | | |
|---|---|---|---|---|---|
| CN | 114266956 A | * | 4/2022 | .............. | B25J 9/161 |

OTHER PUBLICATIONS

International Search Report and Written Opinion for International Application No. PCT/US2023/034576 mailed on Jan. 11, 2024.

* cited by examiner

*Primary Examiner* — Justin Holmes

(57) ABSTRACT

An example transporter includes: a chassis with a locomotive assembly; a first basket supported on the chassis, the first basket configured to collect items for an order; an item sensor configured to detect the items; a picking arm supported on the chassis and having a second basket extending from the picking arm, the picking arm configured to engage the items and draw the items into the second basket; and a processor configured to: in response to detecting the target item by the item sensor, move the picking arm to position the second basket to receive the target item; control the picking arm to engage the target item and draw the target item into the second basket; and control the second basket to deposit the target item into the first basket.

14 Claims, 10 Drawing Sheets

400

405
Receive pick task

410
Navigate to location of target item

415
Move catch basket to catch target item

420
Engage target item and draw into catch basket

425
Deposit target item into order basket

SYSTEM AND METHOD FOR PICKING ITEMS

BACKGROUND

Various object-handling operations, such as removing items from shelves or other support structures, can be mechanized and/or automated, e.g., with robotic arms or the like. Such robotic arms may often be bulky and complex due to the intricacy of grasping and carrying items of varying sizes, shapes and weights.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
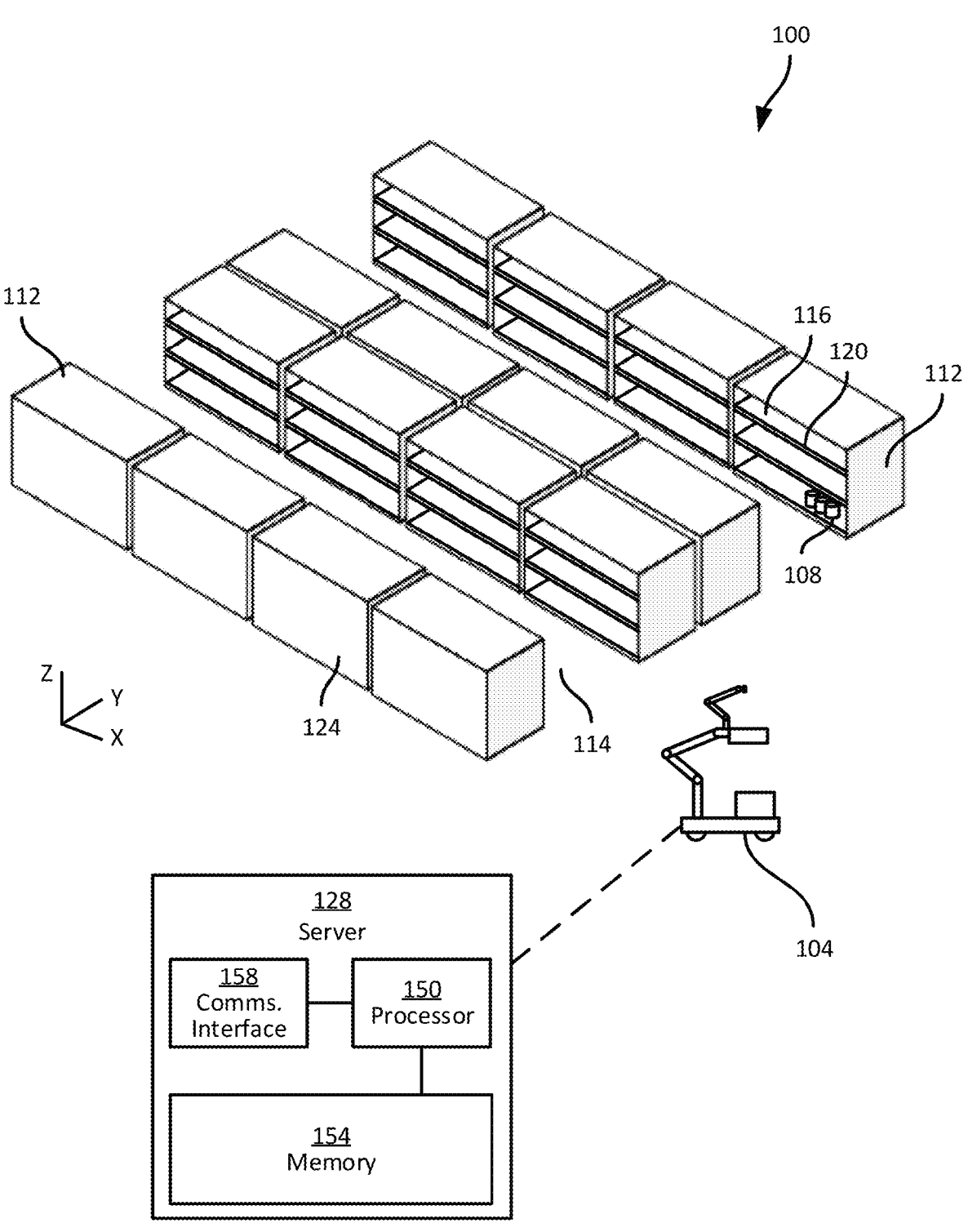
FIG. 1 is a schematic diagram of a system for picking items.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a transporter comprising: a chassis with a locomotive assembly; a first basket supported on the chassis, the first basket configured to collect items for an order; an item sensor configured to detect the items; a picking arm supported on the chassis and having a second basket extending from the picking arm, the picking arm configured to engage the items and draw the items into the second basket; and a processor configured to: in response to detecting the target item by the item sensor, move the picking arm to position the second basket to receive the target item; control the picking arm to engage the target item and draw the target item into the second basket; and control the second basket to deposit the target item into the first basket.

Additional examples disclosed herein are directed to a method comprising: receiving a pick task specifying a target item to pick and deposit in a first basket; in response to detecting the target item on a support structure, moving a picking arm to position a second basket to receive the target item; controlling the picking arm to engage the target item and draw the target item into the second basket; and controlling the second basket to deposit the target item into the first basket.

FIG. 1 depicts a system 100 deployed in an interior of a facility, such as a warehouse, a manufacturing facility, or the like. The system 100 includes a transporter 104 configured to navigate the facility to collect items 108. The facility includes a plurality of support structures 112 carrying items 108. In the illustrated example, the support structures 112 include shelf modules, e.g., arranged in sets forming aisles 114. FIG. 1, specifically, illustrates two aisles 114 each formed by eight shelf modules. The facility can have a wide variety of layouts other than the example layout shown in FIG. 1.

The support structures 112 can include shelf modules, pegboards, bins, and the like, to support the items 108 thereon. As shown in FIG. 1, support structures 112 in the form of shelf modules can include support surfaces 116 terminating in shelf edges 120, which face into the corresponding aisle 114. A shelf edge 120, as will be apparent to those of skill in the art, is a surface bounded by adjacent surfaces having different angles of inclination. In the example illustrated in FIG. 1, each shelf edge 120 is at an angle of about ninety degrees relative to the corresponding support surface 116 above that shelf edge 120 and the underside (not shown) of the support surface 116. In other examples, the angles between a shelf edge 120 and adjacent surfaces is more or less than ninety degrees.

The support surfaces 116 are accessible from the aisles into which the shelf edges 120 face. In some examples, each support structure 104 has a back wall 124 rendering the support surfaces 116 inaccessible from the opposite side of the module. In other examples, however, the support structures 112 can be open from both sides (e.g., the back wall 124 can be omitted).

The support surfaces 116 carry the items 108, which can include any of a wide variety of objects, such as products, packages, and the like. The items 108 may be received at the facility and placed on the support structures 112 for storage or retail. Later, the items 108 may be retrieved from the support structures 112, e.g., for a purchase by a consumer, for consumption in a manufacturing process, for shipment from the facility, or the like.

Retrieval of the items 108 from the support structures 112 may be accomplished by the transporter 104, as described herein. Only one transporter is depicted in FIG. 1, but it is contemplated that more transporters 104 may be deployed in the facility; the number of transporters 104 may be dependent on the size and/or layout of the facility, the nature of the items 108, and the like.

The transporter 104 may additionally be in communication with a server 128 configured to assign pick tasks to the transporter 104. A pick task may include locating and picking a target item 108. To pick the target item 108 from a support structure 112, for example to fulfill an order for a customer, to ship the item 108 from the facility, or the like, the transporter 104 may navigate to a location of a target item 108 and complete a picking operation to retrieve the target item 108 from the support structure 112.

The server 128 may include a special-purpose controller, such as a processor 150, interconnected with a non-transitory computer-readable storage medium, such as a memory 154. The memory 154 includes a combination of volatile memory (e.g., Random Access Memory or RAM) and non-volatile memory (e.g., read only memory or ROM, Electrically Erasable Programmable Read Only Memory or EEPROM, flash memory). The processor 150 and the memory 154 each comprise one or more integrated circuits.

The memory 154 stores computer-readable instructions for execution by the processor 150 to allow the server 128 to allocate tasks and provide instructions to the transporter 104. Those skilled in the art will appreciate that the functionality implemented by the processor 150 via execution of the computer-readable instructions stored in the memory 154 may also be implemented by one or more specially designed hardware and firmware components, such as FPGAs, ASICs and the like in other embodiments.

The server 128 also includes a communications interface 158 interconnected with the processor 150. The communications interface 158 includes any suitable hardware (e.g., transmitters, receivers, network interface controllers and the like) allowing the server 128 to communicate with other computing devices (e.g., the transporter 104) via a suitable combination of local and/or wide-area networks. The specific components of the communications interface 158 are selected based on the type(s) of network(s) used by the server 128.

Figure 2:
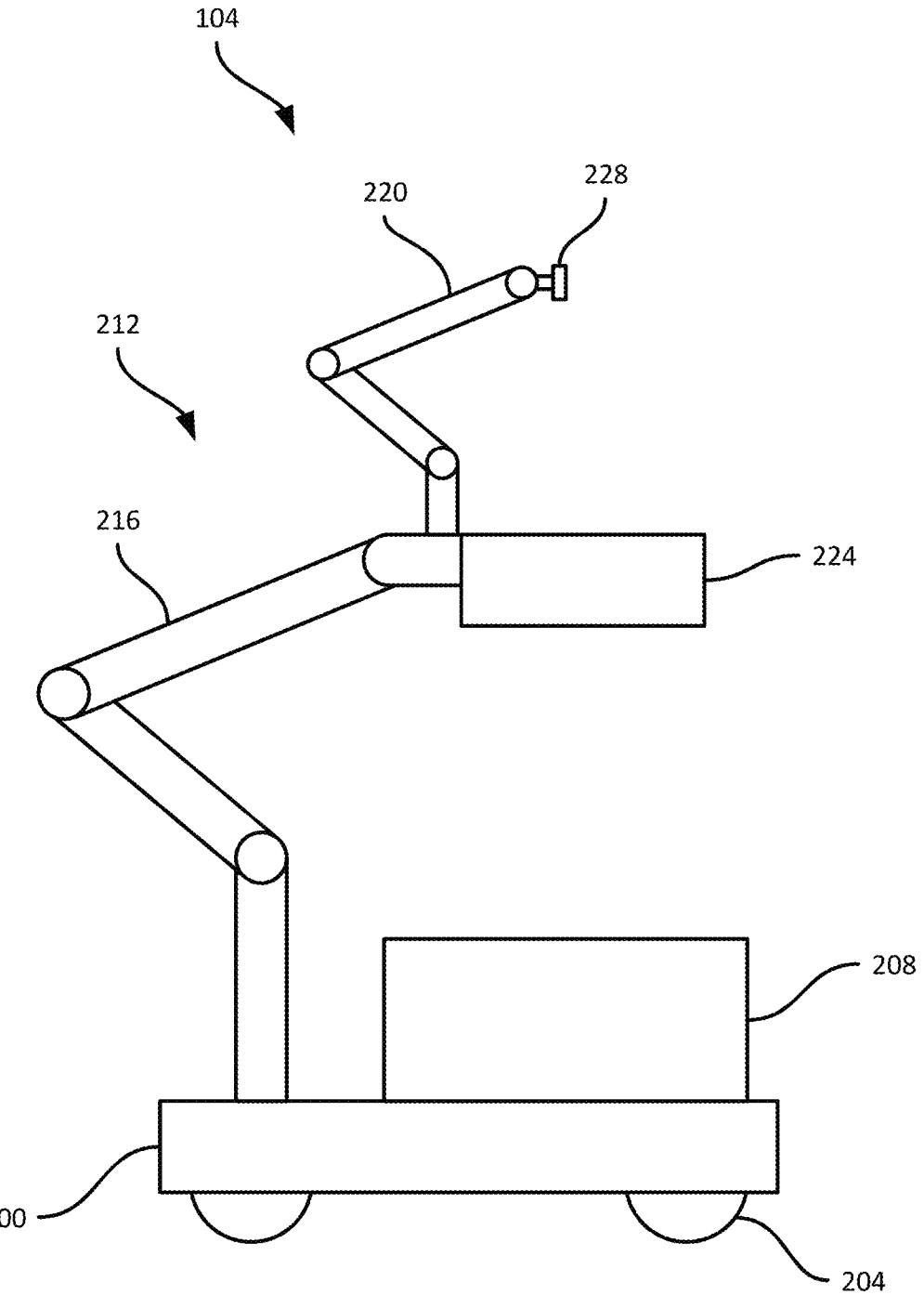
FIG. 2 is a schematic diagram of a transporter for picking items.

FIG. 2 illustrates the transporter 104 in greater detail. The transporter 104 includes a chassis 200 with a locomotive assembly 204, such as wheels, tracks, or the like driven by an electric motor. The transporter 104 may further include one or more navigational components or systems, for example to recognize and/or track the location of the transporter within the facility.

The chassis 200 supports at least one order basket 208 (e.g., a first basket 208) configured to collect items for a given order. In the present example, one order basket 208 is depicted, however in other examples, the chassis 200 may support more than one order basket 208. In some examples, the chassis 200 may support an assembly to control and move the order baskets 208.

The transporter 104 further includes a picking arm 212 supported on the chassis 200. The picking arm 212 includes a first section 216 configured for broader movements and a second section 220 configured for finer movements. More particularly, the first section 216 may generally be movable to locate or position the second section 220 and a catch basket 224 (e.g., a second basket 224) extending from the first section 216 in front of the target item 108 to be picked.

The second section 220 is operable to perform the picking task. In particular, the second section 220 is controllable to locate or position an end effector 228 extending from the second section 220 at approximately a center of the target item 108. The end effector 228 may then be controlled to engage the target item 108 and to draw the target item 108 into the catch basket 224 extending from the first section 216. The end effector 228 is configured to engage the target item 108 at an outer or front surface of the target item 108 (i.e., facing towards the aisle 114 in which the transporter 104 is located) via suction. Accordingly, the end effector 228 may include one or more suction cups, pads, a vacuum pump, a venturi vacuum generator, or the like. The end effector 228 may maintain suction on the target item 108 while the second section 220 retracts towards the transporter

104 to draw the target item 108 into the catch basket 224. That is, the picking arm 212 may be configured to pull or drag, without substantially lifting or grabbing the target item 108 into the catch basket 224 to pick the target item 108.

Accordingly, when the target item 108 is drawn off the support surface 116, the target item 108 may no longer be supported and may drop, particularly if the force of gravity on the target item 108 is greater than the vacuum or suction exerted by the end effector 228. In other examples, the end effector 228 may be configured to release the target item 108 to be dropped.

The catch basket 224 is therefore configured to catch target items 108 drawn off the support surfaces 116 and to deposit the target items 108 into the order basket 208. That is, the catch basket 224 allows the target items 108 to be dropped only a short distance after being drawn off the support surfaces 116. Accordingly, the first section 216 may further be controllable to locate the catch basket 224 at a deposit position relative to the order basket 208. The catch basket 224 is controllable to deposit items 108 in the catch basket 224 into the order basket 208 from the deposit position. For example, the deposit position may be directly above the order basket 208, and the catch basket 224 may include a releasable base to drop the items 108 from the catch basket 224 into the order basket 208 directly below. In other examples, the catch basket 224 may be configured to rotate and/or tilt to deposit the items 108 into the order basket 208.

Figure 3:
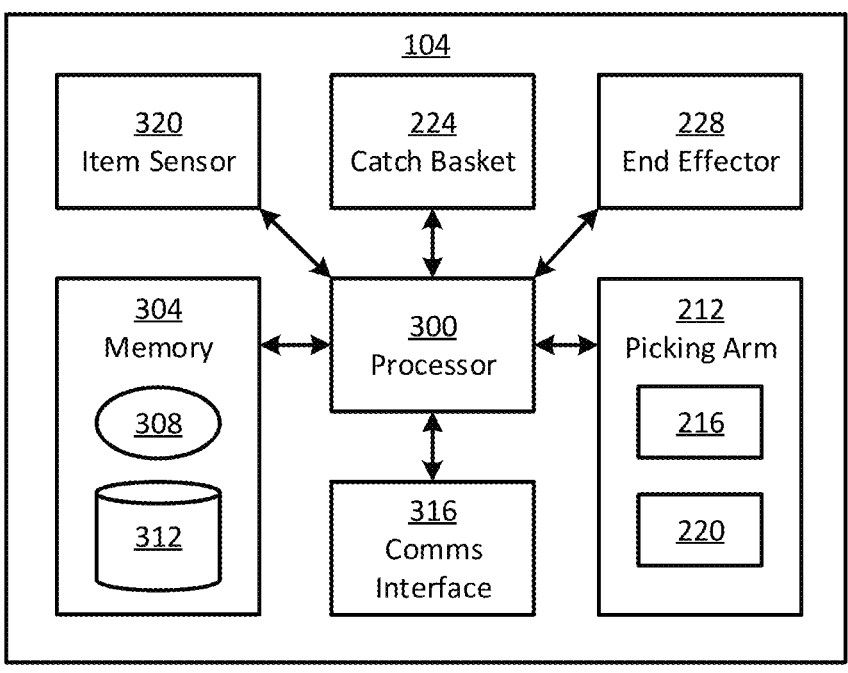
FIG. 3 is a block diagram of certain internal hardware components of the transporter of FIG. 2.

Turning now to FIG. 3, certain internal components of the transporter 104 are illustrated. The transporter 104 includes a processor 300 interconnected with a non-transitory computer-readable storage medium, such as a memory 304. The memory 304 includes a combination of volatile memory (e.g. Random Access Memory or RAM) and non-volatile memory (e.g. read only memory or ROM, Electrically Erasable Programmable Read Only Memory or EEPROM, flash memory). The processor 300 and the memory 304 may each comprise one or more integrated circuits.

The memory 304 stores computer-readable instructions for execution by the processor 300. In particular, the memory 304 stores an application 308 which, when executed by the processor, configures the processor 300 to perform various functions discussed below in greater detail and related to the picking operation of the transporter 104. The application 308 may also be implemented as a suite of distinct applications.

Those skilled in the art will appreciate that the functionality implemented by the processor 300 may also be implemented by one or more specially designed hardware and firmware components, such as a field-programmable gate array (FPGAs), application-specific integrated circuits (ASICs) and the like in other embodiments. In an embodiment, the processor 300 may be, respectively, a special purpose processor which may be implemented via dedicated logic circuitry of an ASIC, an FPGA, or the like to enhance the processing speed of the operations discussed herein.

The memory 304 also stores a repository 312 storing rules and data for the picking operation. For example, the repository 312 may store a plan of the facility defining the locations of the support structures 112 and the aisles 114 along which the transporter 104 may navigate, as well as locations of various items 108 within the facility on the support structures 112. The repository 312 may further store item data, such as dimensions, weights, and the like, for consideration during a picking operation.

The transporter 104 also includes a communications interface 316 enabling the transporter 104 to exchange data with other computing devices such as the server 128. The communications interface 316 is interconnected with the processor 300 and includes suitable hardware (e.g. transmitters, receivers, network interface controllers and the like) allowing the transporter 104 to communicate with other computing devices—such as the server 128. The specific components of the communications interface 316 are selected based on the type of network or other links that the transporter 104 is to communicate over.

The processor 300 is further in communication with the picking arm 212, and in particular, with each of the first section 216 and the second section 220, as well as the end effector 228 to control the picking operation as will be described in further detail below. The processor 300 is in communication with the catch basket 224 to control the catch basket 224 to deposit the target item 108 into the order basket 208, as will be described in further detail below.

The transporter 104 may further include an item sensor 320 interconnected with the processor 300. The item sensor 320 may include one or more image sensors, depth sensors, a suite of sensors, including combinations of the above and the like disposed on the transporter 104, for example on the picking arm 212. The item sensor 320 is configured to capture data representing the items 108 on the support structures 112. The captured data may be processed by the processor 300 to detect the target item. For example, the processor 300 may apply object recognition methods to captured images, or similar.

Figure 4:
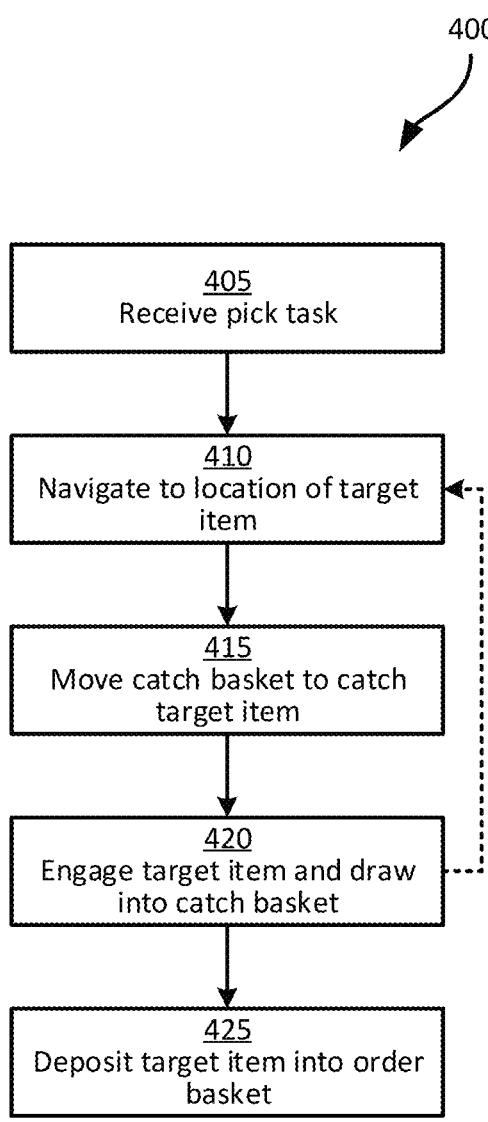
FIG. 4 is a flowchart of a method of picking items.

Turning now to FIG. 4, the functionality implemented by the transporter 104 will be discussed in greater detail. FIG. 4 illustrates a method 400 of picking a target object. The method 400 will be discussed in conjunction with its performance in the system 100, and particularly by the transporter 104, via execution of the application 308. In particular, the method 400 will be described with reference to the components of FIGS. 1, 2, and 3. In other examples, the method 400 may be performed by other suitable devices or systems.

The method 400 is initiated at block 405, where the transporter 104 receives a pick task, for example from the server 128. The pick task may include a complete order including a list of a plurality of target items 108 to collect to fulfil the order. In such examples, the transporter 104 may first determine a picking sequence in which to collect the target items 108 on the list based on item parameters or data (e.g., stored in the repository 312). In particular, since items 108 are generally deposited from the catch basket 224 into the order basket 208 by dropping, sliding, or other gravity-assisted methods, it may be preferable to pick heavier and/or bulkier items first to be deposited at the bottom of the order basket 208, and lighter and/or smaller items second such that the lighter and/or smaller items can be deposited on top of the heavier and/or bulkier items. Accordingly, the transporter 104 may determine the picking sequence according to the item weights and/or dimensions (e.g., as retrieved from the repository 312). The transporter 104 may additionally consider the locations of each of the target items 108 within the facility to optimize the path of the transporter 104 between support structures 112.

When the transporter 104 includes more than one order basket 208, the pick task may include more than one complete order, each order corresponding to a separate order basket 208. This may allow the transporter 104 to increase efficiency in picking items at nearby locations for different orders.

In other examples, rather than receiving a complete order as a pick task, the picking sequence of a given order or set of orders may be determined by the server 128, and hence the transporter 104 may receive, as a pick task, a single target item 108 to pick.

At block 410, the transporter 104 navigates to the location of the target item 108 specified in the pick task received at block 405. For example, the transporter 104 may retrieve the facility plan stored in the repository 312 and determine a route to the specific support structure 112 supporting the target item 108. In some examples, the transporter 104 may receive a route or directions from the server 128. The transporter 104 may then navigate along the route to the specified location by actuating the locomotive assembly 204.

Figure 5:
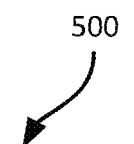
FIG. 5 is a flowchart of a method of moving a catch basket at block 415 of the method of FIG. 4.
Figure 5:
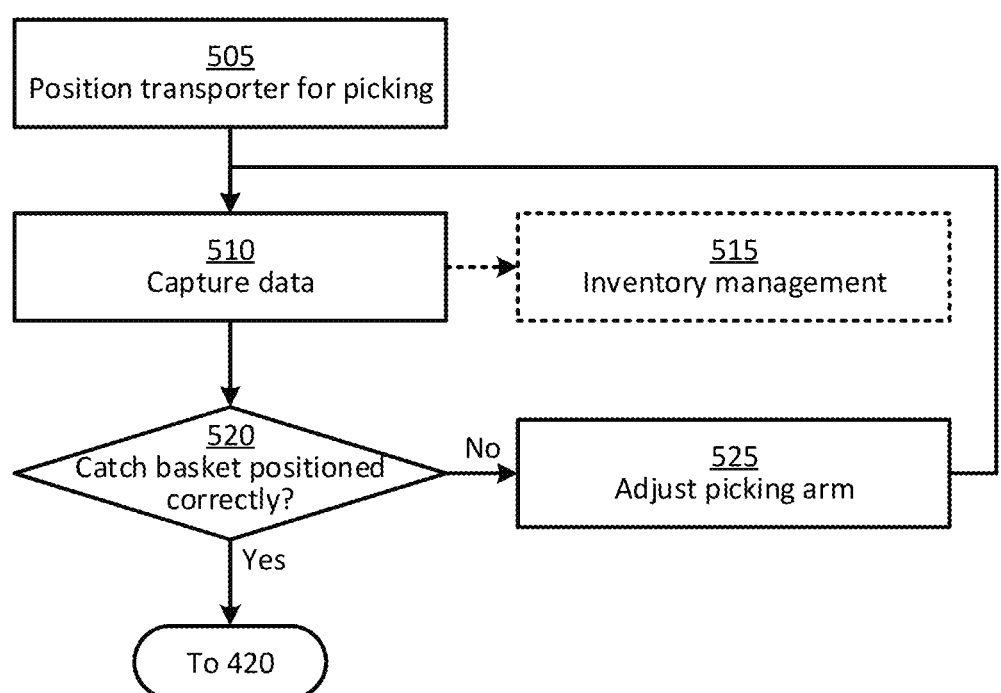

At block 415, the transporter 104 moves the picking arm 212 to locate the catch basket 224 in a position to catch the target item 108. For example, referring to FIG. 5, an example method 500 of moving the catch basket 224 to catch the target item 108 is depicted.

At block 505, the transporter 104 is configured to position itself for a picking operation in front of the target item 108. In particular, the transporter 104 may adjust its position by actuating the locomotive assembly 204. The picking position of the transporter 104 may be defined by substantially aligning the picking arm 212 with the support structure 112 on which the target item 108 is expected to be (e.g., based on the plan retrieved from the memory 304). The picking position of the transporter 104 may be further defined by a distance of the transporter 104 from the support structure 112, and more particularly, from the shelf edge 120. The transporter 104 may verify that it is in the correct picking position by capturing data at the item sensor 320 and processing the captured data to detect the target item 108 and the distance of the transporter 104 from the shelf edge 120. The transporter 104 may then make adjustments to move itself into the appropriate picking position.

After having moved itself into a picking position aligned with support structure 112, the transporter 104 is configured to align the picking arm 212 with the particular target item 108. Accordingly, at block 510, the transporter 104 controls the item sensor 320 to capture data representing the support structure 112. For example, the item sensor 320 may capture an image and the processor 300 may apply object detection and recognition algorithms to identify the items 108 on the support structure 112.

Figure 6:
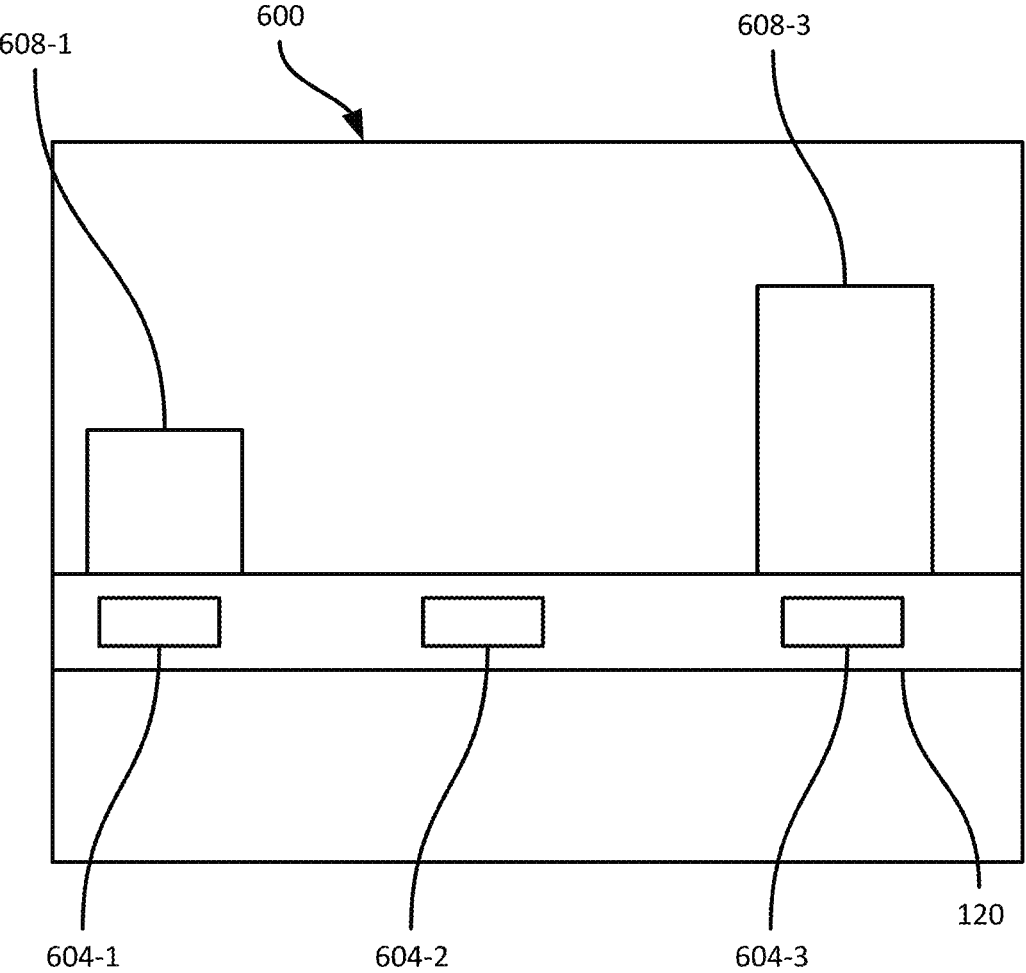
FIG. 6 is a schematic diagram of an example image captured at block 510 of the method of FIG. 5.

For example, referring to FIG. 6, an example image 600 captured by the item sensor 320 is depicted. The image 600 includes a shelf edge 120 with three price labels 604-1, 604-2, and 604-3 on it. The support surface of the shelf edge 120 supports products 608-1 and 608-3 corresponding to the price labels 604-1 and 604-3. Upon applying object detection and recognition algorithms, the processor 300 may determine that the product 608-3 corresponds to the target item.

Returning to FIG. 5, optionally, at block 515, in response to identifying the items 108 on the support structure 112, the transporter 104 may perform various item or inventory management functions for both the target item as well as other items 108 on the support structure 112 containing the target item. For example, the transporter 104 may check stock of the items 108, verify tags for the items 108, verify prices for the items 108, and the like. In other examples, the transporter 104 may send the captured data to the server 128 to perform the inventory management functions at block 515.

Thus for example, upon analyzing the image 600, the transporter 104 may determine that the product corresponding to price label 604-2 has no stock and may send a notification to the server 128.

At block 520, the transporter 104 determines based on the data captured at block 510 whether the catch basket 224 is positioned to catch the target item (i.e., in a catch position). For example, the item sensor 320 may be positioned at a predefined fixed position relative to the catch basket 224, and hence the transporter 104 may be configured to determine the position of the catch basket 224 relative to the target item 108 based on the detected position of the target item 108 within the captured data. In other examples, the item sensor 320 may be located such that the catch basket 224 is within its field of view, and hence the resulting captured data may further include data representing the catch basket 224 and its position relative to the target item 108.

In particular, the catch position of the catch basket 224 may be substantially aligned with (e.g., centered to) the target item 108. For example, the item sensor 320 may be substantially aligned with the catch basket 224. In the example image 600 of FIG. 6, the target item 108 is off-center, and hence the transporter 104 may determine that the catch basket 224 is not in the catch position until the target item 108 is substantially centered within the captured image.

Further, the catch position of the catch basket 224 may be just below the target item 108. That is, since the picking arm 212 is configured to draw the target item 108 into the catch basket 224 substantially without lifting the target item, the catch basket 224 may be positioned to catch the target item 108 when a top of the catch basket 224 is below a surface or other item on which the target item 108 is positioned. For example, the target item 108 can be positioned on a top surface of the support surface 116 (as shown in FIG. 7) or stacked on top of another item positioned on the top surface of the support surface 116 (as shown in FIG. 8).

Preferably, to reduce the dropping distance when the target item 108 is drawn off the support surface 116 and dropped by the picking arm 212, the catch basket 224 may be located within a threshold distance (e.g., 2 cm, 5 cm, etc.) of the support surface or support item supporting the target item 108. Accordingly, the transporter 104 may detect, based on the data captured by the item sensor 320, the support surface or item of the target item 108 and locate the top of the catch basket 224 below that support surface or item.

Figure 7:
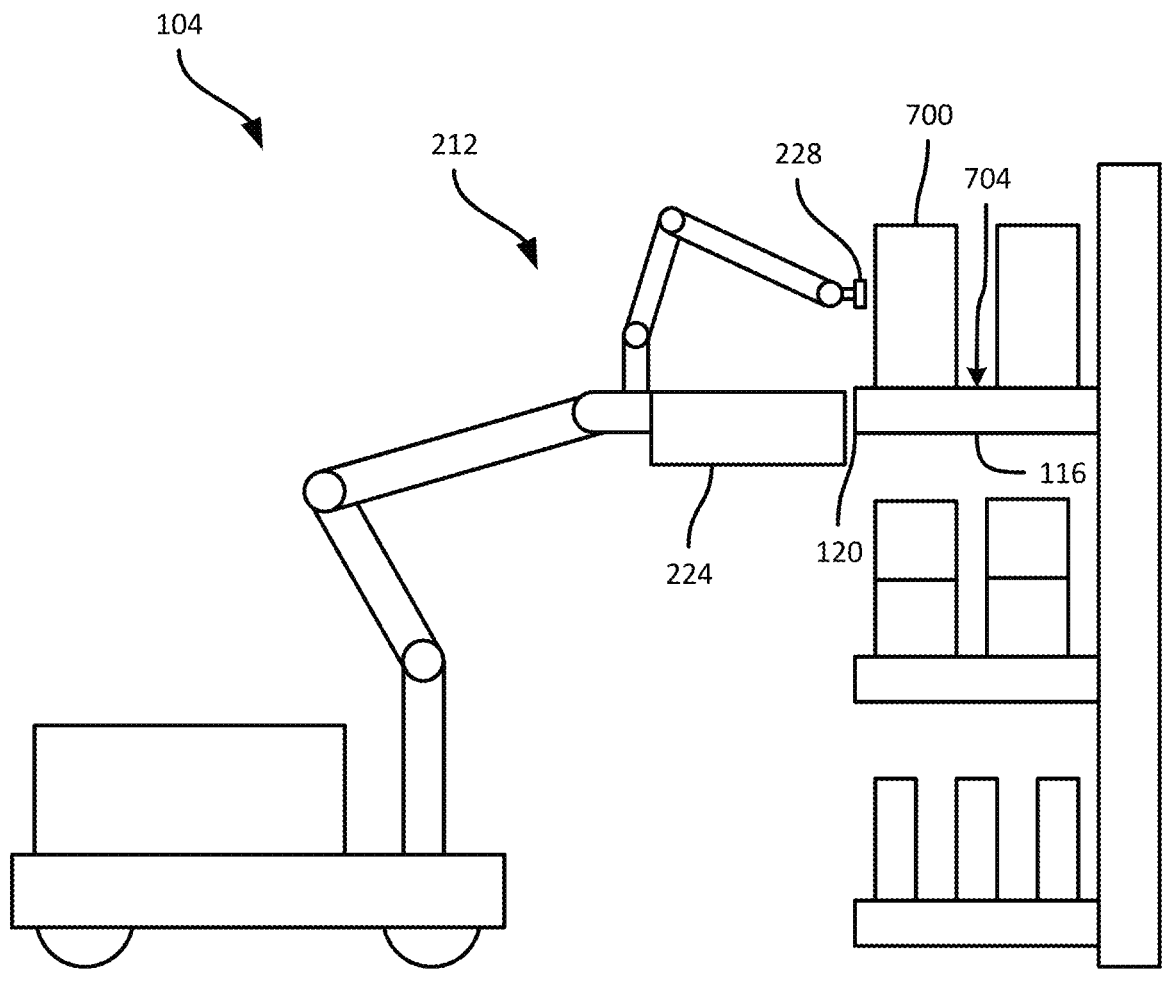
FIG. 7 is a schematic diagram of the catch basket in a catch position at block 415 of the method of FIG. 4.

For example, referring to FIG. 7, a target item 700 is located directly on one of the support surfaces 116. Accordingly, the transporter 104 may identify a top surface 704 of the support surface 116. The catch position for the catch basket 224 may therefore be defined to be slightly below the top surface 704. Further, the catch basket 224 may be located within a threshold distance (e.g., 2 cm, 5 cm, etc.) of the shelf edge 120.

Figure 8:
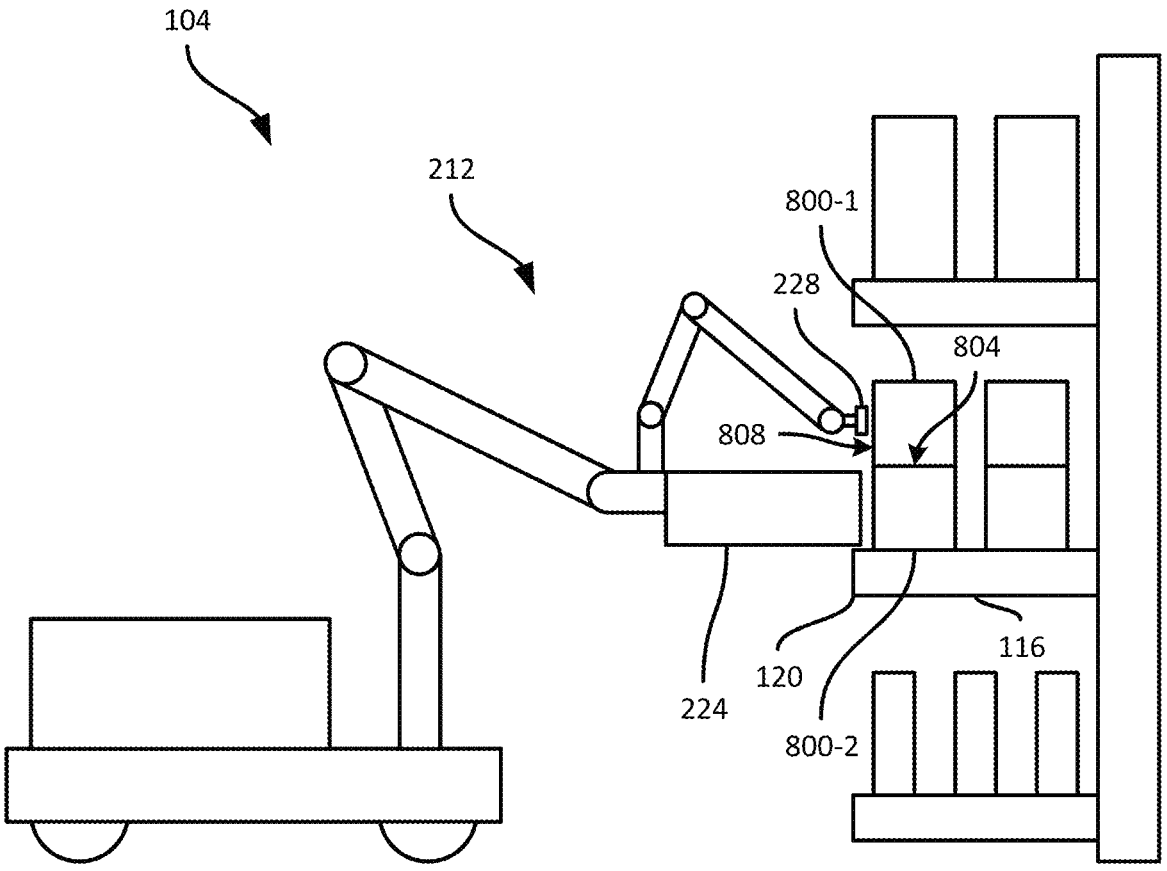
FIG. 8 is a schematic diagram of the catch basket in another catch position at block 415 of the method of FIG. 4.

Referring to FIG. 8, a target item 800-1 is stacked on top of another target item 800-2. Accordingly, the transporter 104 may identify the target item 800-1 as a top target item in the stack and identify the target item 800-2 as a support item (i.e., an item on which the target item 800-1 is supported). The catch position for the catch basket 224 may therefore be defined to be slightly below a top surface 804 of the support target item 800-2. By locating the catch basket 224 just below the top surface 804 of the support target item 800-2, the support target item 800-2 may be blocked by the catch basket 224 itself from being drawn off the support surface 116 on which the support target item 800-2 is supported. Further, since the target items 800 are inset from the shelf edge 120, the catch position may allow the catch basket 224 to extend into the support structure 112 past the shelf edge 120. The transporter 104 may determine whether such extension past the shelf edge 120 is possible based on a height of the catch basket 224 and a distance above the support surface 116 on which the top target item 800-1 is supported.

Returning to FIG. 5, if at block 520, the catch basket 224 is not correctly positioned, then the method 500 proceeds to block 525. At block 525, the transporter 104 adjusts the position of the picking arm 212 to move the catch basket 224. In particular, the transporter 104 may control the first section 216 to adjust the position of the catch basket 224. The method 500 then returns to block 510 to re-capture data and re-evaluate the position of the catch basket 224 until the catch basket 224 is located in the catch position for the target item 108.

If at block 520, the catch basket 224 is correctly positioned in the catch position for the target item 108, then the method 500 ends and returns to block 420 of the FIG. 4.

At block 420, the transporter 104, and more particularly the end effector 228 of the picking arm 212, is configured to engage the target item 108 and draw the target item 108 into the catch basket 224.

In particular, having located the catch basket 224 in the catch position, the transporter 104 may maintain the first section 216 of the picking arm 212 to maintain the catch basket 224 in the catch position. Accordingly, the transporter 104 may control the second section 220 of the picking arm 212 to engage the target item 108.

For example, the second section 220 may be controlled to move the end effector 228 into an engagement position. The engagement position of the end effector 228 may be defined to be within a threshold distance (e.g., 2 cm, 5 cm, etc.) of a front surface of the target item 108. For example, referring again to FIG. 8, the end effector 228 is depicted in the engagement position relative to a front surface 808 of the target item 800-1. In other examples, the engagement position may be defined to be a position in which the end effector 228 is in contact with the front surface of the target item.

The engagement position of the end effector 228 may also be defined at a certain height relative to the target object 108 based on the dimensions, shape, and weight of the target object 108. For example, the engagement position may substantially center the end effector 228 relative to the height of the target object, as depicted in FIG. 8, or the engagement position may locate the end effector 228 above center, in an upper half of the target object, as depicted in FIG. 7.

The target engagement position for a given target item 108 may be specified and stored for example in the repository 312 as part of the item data. Further, in some examples, the target engagement position may vary based on the type of end effector 228 employed by the transporter 104.

To move the end effector 228 into the engagement position, the transporter 104 may capture data representing the target item 108 and the end effector 228 using the item sensor 320 and make fine motor control adjustments to the position of the end effector 228 by moving the second section 220.

In response to detecting that the end effector 228 is in the engagement position (e.g., via detection of the position of the end effector 228 by the item sensor 320), the transporter 104 may then actuate the end effector 228 to engage the target item 108. For example, the processor 300 may activate a vacuum pump associated with the end effector 228 to draw or pull the target item 108 towards the end effector 228 via a suction cup or the like to engage the front surface of the target item 108. The vacuum may be maintained as the second section 220 is moved until the end effector 228 is in a drop position above the catch basket 224. In some examples, the vacuum may be sufficient to maintain engagement of the target item 108 with the end effector 228 to the drop position, and hence the transporter 104 may control the end effector 228 to release the target item 108 to be caught by the catch basket 224. In other examples, the vacuum may be sufficient to draw the target item 108 while the target item 108 is supported by a support surface 116 or a support item, but insufficient to lift the target item 108 independently. In such examples, the end effector 228 may substantially drag the target item 108 off the support surface 116 or support item to be dropped into the catch basket 224.

Figure 9:
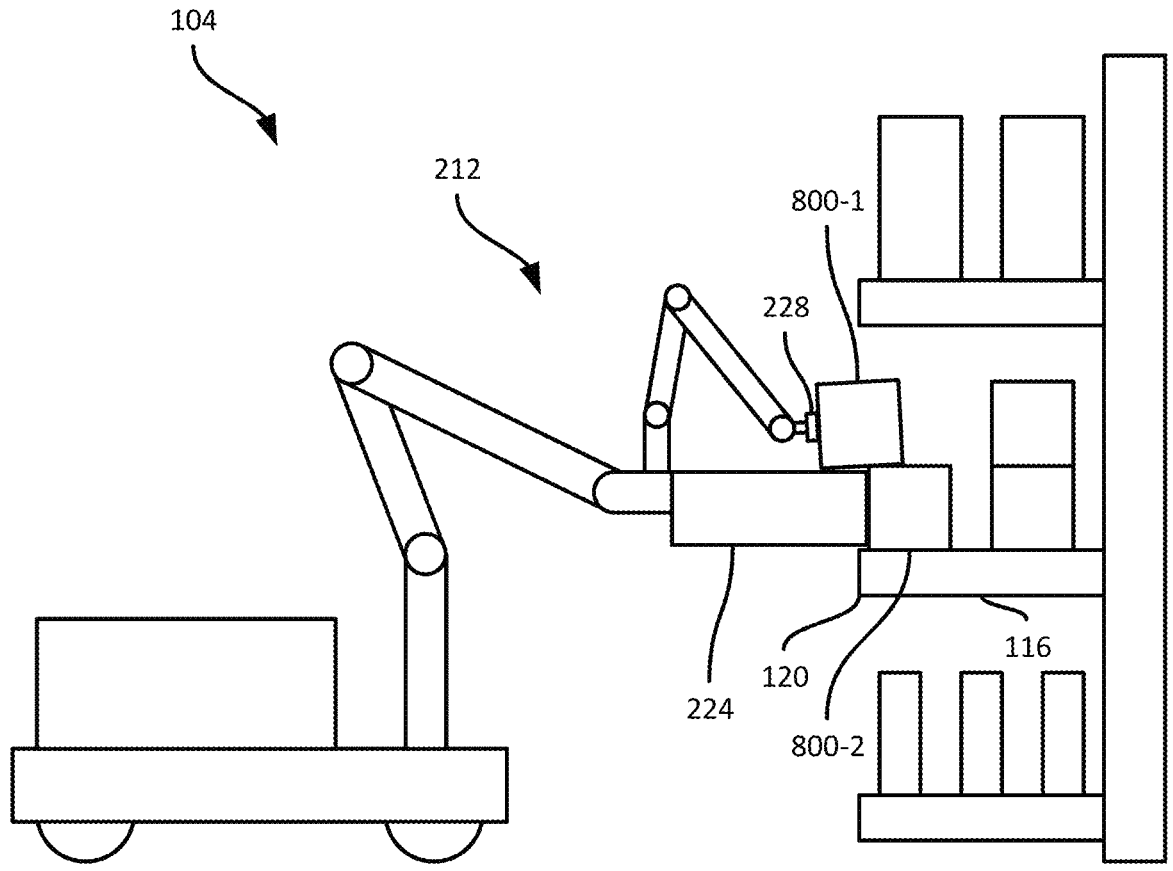
FIG. 9 is a schematic diagram of the performance of block 420 of the method of FIG. 4.

For example, referring to FIG. 9, the end effector 228 engages the top target item 800-1 and draws the target item 800-1 into the catch basket 224. Further, as can be seen, the catch basket 224 is located in front of the support target item 800-2 and obstructs the support target item 800-2 from being drawn off the support surface 116 due to friction from the movement of the top target item 800-1.

Returning again to FIG. 4, in some examples, based on the weights of the target items on the list of items to be collected, and the weight capacity of the picking arm 212 and the catch basket 224, the method 400 may return to block 410 to pick another target item before proceeding to block 425. That is, the transporter 104 may pick a subset of items on the list and drop each item of the subset of items into the catch basket 224 prior to depositing the items in the catch basket 224 into the order basket 208.

In some examples, after drawing the target item 108 into the catch basket 224, the transporter 104 may reface the items 108 on the support surface 116. That is, having picked the target item 108 closest to the shelf edge 120, the transporter 104 may be configured to draw target items 108 from rear positions on the support surface 116 towards the shelf edge 120.

At block 425, after having received the target item 108 in the catch basket 224, the transporter 104 may deposit the target item 108 from the catch basket 224 into the order basket 208.

In particular, the transporter 104 may move the catch basket 224 into a deposit position relative to the order basket 208 by controlling the picking arm 212, and more particularly, the first section 216. The deposit position may be substantially above the order basket 208. The catch basket 224 may further have a release mechanism controllable by the processor 300 to allow the catch basket 224 to release items therein into the order basket 208.

Figure 10:
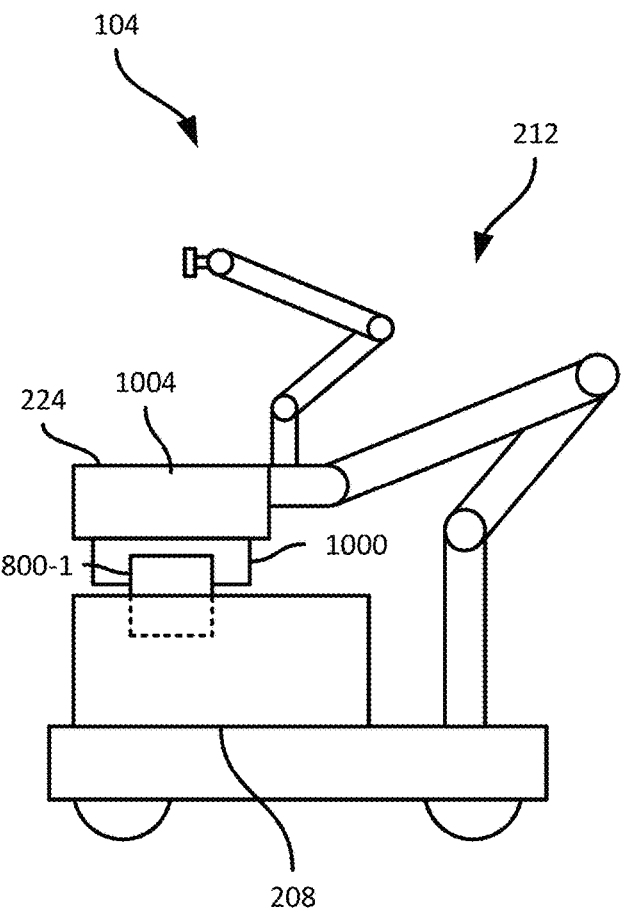
FIG. 10 is a schematic diagram of the performance of block 425 of the method of FIG. 4.
Figure 10:
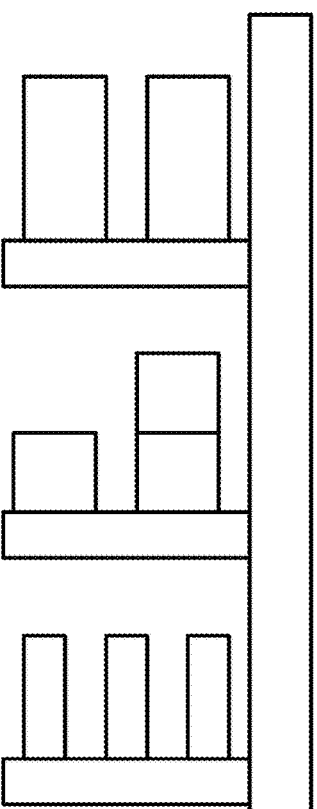

For example, in FIG. 10, the catch basket 224 includes a releasable base 1000 which may be released from the sides 1004 of the catch basket 224 via latches, electromagnets, or the like. Thus, to deposit the target item 800-1 into the order basket 208, the transporter 104 may release the base 1000 from the sides 1004 and allow the target item 800-1 to drop down into the order basket 208.

In other examples, other release mechanisms are also contemplated. For example, the catch basket 224 may be rotatable relative to the first section 216 of the picking arm 212. In such examples, one of the sides 1004 may be releasable to allow the target item to slide off the base 1000 via the releasable side 1004 and into the order basket 208. In still further examples, the catch basket 224 may be rotated to a substantially inverted position to deposit the target item into the order basket 208.

In some examples, the transporter 104 may additionally move the order basket 208 to a receiving location, for example if the transporter 104 supports more than one order basket 208. Further, the transporter 104 may adjust the height of the order basket 208 to reduce the dropping distance of the target item(s) from the catch basket 224 into the order basket 208.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A transporter comprising:
a chassis with a locomotive assembly;
a first basket supported on the chassis, the first basket configured to collect items for an order;
an item sensor configured to detect the items;
a picking arm supported on the chassis and having an end effector and a second basket extending from the picking arm, the picking arm configured to engage the items and draw the items into the second basket; and
a processor configured to:
in response to detecting a target item by the item sensor, move the picking arm to position the second basket to receive the target item;
control the picking arm to engage the target item and draw the target item into the second basket by activating a vacuum pump associated with the end effector to apply a vacuum to pull the target item towards the end effector to engage a front surface of the target item; and
control the second basket to deposit the target item into the first basket, wherein
the picking arm comprises a first section configured to move to position the second basket to receive the target item, and a second section having the end effector configured to engage the target item, the second section configured to move to position the end effector to engage the target item and draw the target item into the second basket.

2. The transporter of claim 1, wherein the processor is configured to:
detect, using the item sensor, a support surface or support item on which the target item is supported; and position a top surface of the second basket within a threshold distance of the support surface or support item.

3. The transporter of claim 1, wherein the second basket comprises a releasable base configured to release to deposit the target item into the first basket.

4. The transporter of claim 1, wherein the second basket is rotatable to deposit the target item into the first basket.

5. The transporter of claim 1, wherein the processor is further configured to:
receive a list of target items to be collected in the first basket; and
determine a picking sequence of the target items to be collected based on item parameters.

6. The transporter of claim 5, wherein the processor is configured to pick a subset of items on the list of target items into the second basket according to the picking sequence prior to depositing the subset of items from the second basket into the first basket.

7. The transporter of claim 1, wherein the processor is further configured to perform inventory management functions for the items detected by the item sensor.

8. A method comprising:
receiving a pick task specifying a target item to pick and deposit in a first basket;
in response to detecting the target item on a support structure, moving a picking arm to position a second basket to receive the target item;
controlling the picking arm to engage the target item and draw the target item into the second basket by activating a vacuum pump associated with an end effector of the picking arm to apply a vacuum to pull the target item towards the end effector to engage a front surface of the target item; and
controlling the second basket to deposit the target item into the first basket, wherein
moving the picking arm comprises moving a first section of the picking arm to position the first basket to receive the target item; and
controlling the picking arm comprises controlling a second section of the picking arm to position the end effector extending from the second section to engage the target item and draw the target item into the second basket.

9. The method of claim 8, further comprising:
detecting a support surface or support item on which the target item is supported; and
positioning a top of the second basket within a threshold distance of the support surface or support item.

10. The method of claim 8, further comprising releasing a releasable base of the second basket to deposit the target item into the first basket.

11. The method of claim 8, further comprising rotating the second basket to deposit the target item into the first basket.

12. The method of claim 8, further comprising:
receiving a list of target items to be collected in the first basket; and
determining a picking sequence of the target items to be collected based on item parameters.

13. The method of claim 12, further comprising picking a subset of items on the list of target items into the second basket according to the picking sequence prior to depositing the subset of items from the second basket into the first basket.

14. The method of claim 8, further comprising performing inventory management functions for the items detected by an item sensor.

* * * * *